C. HARIVEL.
Liquid Skimmer.
No. 4,014.  Patented April 26, 1845.
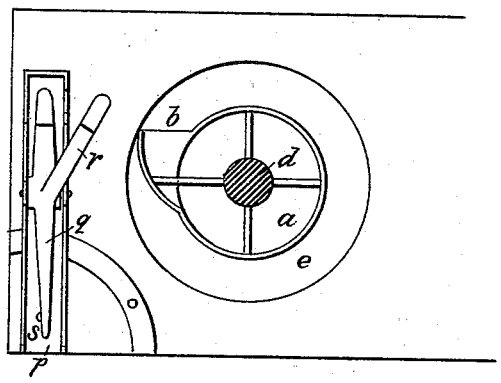
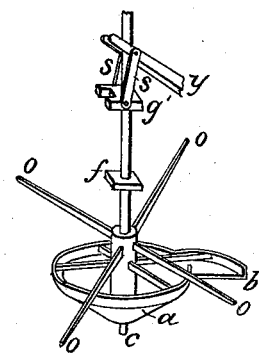
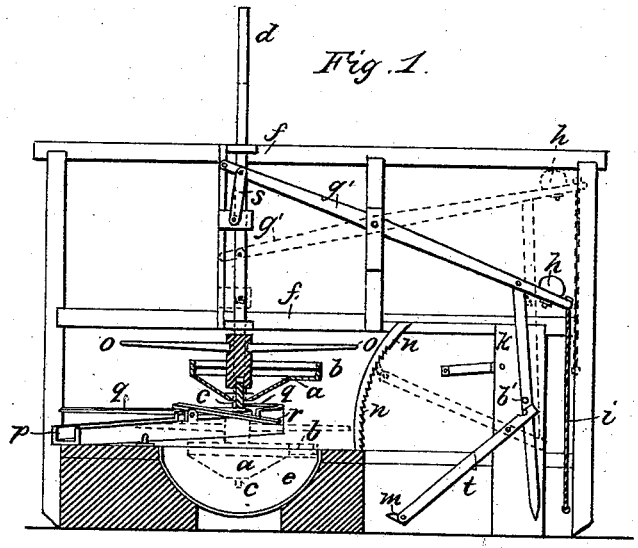

UNITED STATES PATENT OFFICE.

CHARLES HARIVEL, OF BATON ROUGE, LOUISIANA.

IMPROVEMENT IN MACHINES FOR SKIMMING LIQUIDS.

Specification forming part of Letters Patent No. 4,014, dated April 26, 1845.

*To all whom it may concern:*

Be it known that I, CHARLES HARIVEL, of Baton Rouge, in the State of Louisiana, have invented a new and useful Machine for Skimming Liquids; and I do hereby declare that the following is a full, clear, and exact description thereof, reference being had to the drawings herewith accompanying, in which—

Figure 1 is a side elevation of the application of the machine to sugar-kettles, the kettle being drawn in section. Fig. 2 is a view of the skimmer in plan and the apparatus connected therewith.

The same letters are used in both figures to designate the similar parts.

The nature of my invention consists in introducing into the liquid to be skimmed a vessel having a flange extending out horizontally on one side, with a rim standing up on its outer edge, as hereinafter more particularly described. Said vessel, by being revolved, skims the liquid and receives the skimmings into the center of the vessel.

The construction of my apparatus is as follows: A conical or other convenient shaped vessel, $a$, is made, from which on one side a projection is made horizontally, like a rim, one edge of which, $b$, is on a radial line from the center of the vessel $a$ (or nearly so) to the outer extremity of the projection. It is thence gradually contracted till it reaches the outer circumference of the vessel $a$, its outer edge being bounded by a spiral line, on which there is a vertical rim, that also continues around the vessel $a$ till it meets the radial line $b$, and forms a sort of spoon to gather the scum. At the lowest part of the conical vessel $a$ there is a valve, $c$, (shown in Fig. 1,) and the whole is suspended to the lower end of a round vertical rod, $d$, directly over the kettle or other reservoir, $e$, in which the liquid is contained that is to be skimmed. This rod $d$ slides up and down, and also revolves in, stationary guides $f$, as shown more clearly in Fig. 3. This rod is connected with a lever, $g$, by means of a collar, $g'$, in which it turns, and that sustains it, and two connecting-rods, $s$—one on each side—uniting said collar with the lever $g$ at one end. At the other the lever bears a counterpoise-weight, $h$, and has a cord, $i$, attached to it to hoist up the skimmer by. A rod, $k$, is also appended to the same end of the lever $g$, by which the lever is held to the proper place for the different operations about to be described. Near the floor, and under the lever $g$, there is another lever, $l$, the short arm of which receives the lower end of the rod $k$ into a notch cut in it for that purpose, when the skimmer is lowered down to the kettle. The long arm of lever $l$ has a pawl, $m$, on its end that takes into a segment-rack, $n$, constructed for the purpose. This holds the skimmer down to the proper depth in the liquid, as shown by the red lines in Fig. 1, by which it is represented in that position, for the operation of skimming.

The operation of this apparatus is as follows: The rod $k$ is unhooked from the pin $k'$, in which position it is shown in Fig. 1, and the skimmer is lowered down till it rests on the surface of the liquid. The lever $l$ is then brought under the end of the rod $k$, and the opposite end borne down till the skimmer is sunk so as to bring the rim or skimming-edge or spoon $b$ below the scum. (This position is represented in Fig. 1 by the red lines.) The skimmer is then turned round by means of four horizontal arms, $o$, which are attached to the rods $d$. This operation takes the scum from the surface of the liquid and deposits it in the vessel $a$. The rod $k$ is then released, and the skimmer hoisted up into the position indicated by the drawings, Fig. 1. A trough, $p$, having in it a lever, $q$, which is suspended in the center so that its ends can move up and down, and which has an arm, $r$, forking out over one side of the trough connected with it, is swung round on a pivot, $s$, till the forked arm $r$ is brought under the stem of the valve $c$ in the bottom of the vessel $a$. The opposite end of the lever $q$ is then borne down, which causes the valve $c$ to open, and the sirup or other liquid which may have been taken in in the operation of skimming is allowed to escape back again into the kettle below, after which the trough is moved under the valve, and the lever $q$ acts to open the valve $c$, and the scum is drawn off into the trough, and discharged into a proper receptacle.

Having thus fully described my machine and its operation, what I claim as my invention, and desire to secure by Letters Patent, is—

The apparatus for skimming a liquid by means of a vessel in which the scum is collected by the revolution of the flange or sweep, forming a kind of spoon, acting down below but very near the level of the scum, as set forth.

C. HARIVEL.

Witnesses:
   A. S. HERRON,
   J. J. BURK.